US011190860B2

(12) United States Patent
Minkenberg et al.

(10) Patent No.: US 11,190,860 B2
(45) Date of Patent: Nov. 30, 2021

(54) SWITCH WITH A SHUFFLE

(71) Applicant: ROCKLEY PHOTONICS LIMITED, London (GB)

(72) Inventors: Cyriel Johan Agnes Minkenberg, Neuheim (CH); Andrew George Rickman, Marlborough (GB)

(73) Assignee: Rockley Photonics Limited, Altrincham (GB)

(*) Notice: Subject to any disclaimer, the term of this patent is extended or adjusted under 35 U.S.C. 154(b) by 0 days.

(21) Appl. No.: 16/846,213

(22) Filed: Apr. 10, 2020

(65) Prior Publication Data
US 2020/0329288 A1 Oct. 15, 2020

(30) Foreign Application Priority Data

Apr. 12, 2019 (GB) .................................... 1905197

(51) Int. Cl.
H04Q 11/00 (2006.01)
H04B 10/25 (2013.01)
H04J 14/02 (2006.01)
(52) U.S. Cl.
CPC ......... H04Q 11/0005 (2013.01); H04B 10/25 (2013.01); H04J 14/02 (2013.01);
(Continued)
(58) Field of Classification Search
None
See application file for complete search history.

(56) References Cited

U.S. PATENT DOCUMENTS 5,936,954 A * 8/1999 Song ................... H04L 49/1561
370/380
6,570,521 B1 * 5/2003 Schofield ............ H03M 1/0673
341/143
(Continued)

FOREIGN PATENT DOCUMENTS

WO  WO 2012/040205 A1   3/2012
WO  WO 2014/008027 A1   1/2014
(Continued)

OTHER PUBLICATIONS

U.K. Intellectual Property Office Examination Report, dated Jul. 24, 2020, for Patent Application No. GB1905197.8, 4 pages.
(Continued)

Primary Examiner — Darren E Wolf
(74) Attorney, Agent, or Firm — Lewis Roca Rothgerber Christie LLP

(57) ABSTRACT

A switch for switching a signal between a source client device and a destination client device, the switch includes: a switch module housing unit including a switch module, configured to output a first signal, and a second signal; a shuffle including: a first input, a first output, and a second output, wherein the first input is configured to receive the first signal and the second signal from the switch module, and to direct the first signal to the first output and the second signal to the second output. A switch including a switch module housing unit, including: a first input, a second input, and a first output, wherein the first input is configured to receive a first signal and direct it to the first output, and the second input is configured to receive a second signal and direct it to the first output.

20 Claims, 13 Drawing Sheets

(52) U.S. Cl.
CPC ............... *H04Q 2011/0016* (2013.01); *H04Q 2011/0058* (2013.01)

(56) References Cited

U.S. PATENT DOCUMENTS

| | | |
|---|---|---|
| 2006/0171712 A1 | 8/2006 | Tanaka et al. |
| 2010/0254652 A1* | 10/2010 | Kirkpatrick ........ H04Q 11/0005 385/17 |
| 2015/0295655 A1 | 10/2015 | Hessong et al. |
| 2017/0041691 A1* | 2/2017 | Rickman ............ H04Q 11/0071 |
| 2017/0105060 A1* | 4/2017 | Oltman .............. H04Q 11/0005 |

FOREIGN PATENT DOCUMENTS

| | | |
|---|---|---|
| WO | WO 2015/172230 A1 | 11/2015 |
| WO | WO 2018/153939 A1 | 8/2018 |
| WO | WO 2018/162978 A1 | 9/2018 |

OTHER PUBLICATIONS

U.K. Intellectual Property Office Search and Examination Report, dated Oct. 10, 2019, for Patent Application No. GB1905197.8, 8 pages.

* cited by examiner

This is impractical: Each MPO connector needs to be connected to each MPO connect on the opposite side.

Perform physical breakout at Tier-2 in a "shuffle box." Drawback is added loss from 2 additional connectors.

With duplex fiber, the individual lanes from a port can't be shuffled directly.

SWITCH WITH A SHUFFLE

CROSS-REFERENCE TO RELATED APPLICATION(S)

The present application claims priority to and the benefit of Great Britain Patent Application No. 1905197.8, filed Apr. 12, 2019, the entire content of which is incorporated herein by reference.

FIELD

One or more embodiments of the present invention relate to a switch for switching a signal from a source client device to a destination client device.

BACKGROUND

In data centre networks, switch ports are often configured to comprise multiple physical lanes. For example, a single 100 gigabits per second (herein, "Gbps") port may include four 25 Gbps physical lanes. In some cases, the switch itself may support configuring each individual lane as a separate port. For example, a switch ASIC having 256×25 Gbps lanes may be configured as 256×25 Gbps ports, 128×50 Gbps ports, or 64×100 Gbps ports. In doing so, there is a trade-off between the switch radix, i.e. the port count, and the per-port data rate. At the network level, it may make sense to opt for high port count rather than high port rate, even within a fabric, e.g. for top-of-rack uplinks, or spine-leaf connectivity.

Another important consideration is that an increased port count necessarily increases the number of physical links (i.e. optical or electrical cables) which are required. The increase in physical links increases by the same factor as the increase in the port count. Optical links typically get cheaper per capacity with increasing lane count (e.g. a 4-lane transceiver is cheaper in $/Gbps than a 1-lane transceiver). However, the switch face plate may not be able to accommodate so many transceivers, and cable management can become cumbersome.

SUMMARY

Some embodiments of the present invention provide a way to leverage standards-compliant WDM-based optical interfaces, such as CWDM4, to increase effective switch radix, without a corresponding increase in the number of spine-leaf optical fibres. Broadly speaking, some embodiments of the present invention achieve this aim by providing an optoelectronic switch in which a shuffle layer is located on either a spine switch module housing unit or a leaf switch module housing unit, providing an additional layer of switching capability outside the switch fabric. In this way, there is no need to provide additional cables or physical links in the fabric, since the additional switching capability is contained within the spine or leaf switch module housing units. Specifically, a first aspect of some embodiments of the present invention provides a switch for switching a signal between a source client device and a destination client device, the switch including:
  a switch module housing unit including:
    a switch module, configured to output a first signal and a second signal;
    a shuffle including:
      a first input
      a first output, and
      a second output,
  wherein the first input is configured to receive the first signal and the second signal from the switch module, and to direct the first signal to the first output and the second signal to the second output. In some embodiments, the switch may include a plurality of switch module housing units, between which signals may be switched. Specifically, the switch may include a first switch module housing unit and a second switch module housing unit, each including at least one switch module, and, in some embodiments, a plurality of switch modules. In some embodiments, the switch includes a switching fabric, and the first output and the second output are configured, respectively, to output the first signal and the second signal to the switching fabric. The term "switching fabric" should be understood to mean an array of connectors (e.g. optical connectors or electrical connectors) which are arranged to connect the switch modules on the first switch module housing unit with switch modules of the second switch module housing unit. The shuffle is an important feature of all embodiments of all aspects of this invention, and therefore it is important that this term is interpreted correctly. In this technical field, the term "shuffle" is used to refer to a component or device having a plurality of inputs and a plurality of outputs, with a plurality of connections providing an interconnecting fabric between those inputs and outputs such that the output outputs form a permutation of the inputs, so that signals (be they electrical, optical, or otherwise) may be switched from one of the inputs to one of the outputs. The shuffle may be a passive component, i.e. one with no active switching capacity, but embodiments in which the shuffle does have active switching capacity may still fall within the scope of the invention.

The first switch module housing unit may be in the form of a spine switch module housing unit, and the switch module may be a spine switch module. A spine switch module is a switch module which has connections only to the fabric, and is not connected to any external client devices. In other words, all the ports of a spine switch module may be referred to as fabric ports. Alternatively, the first switch module housing unit may be in the form a leaf switch module housing unit, and the switch module may be a leaf switch module. A leaf switch module is a switch module which has connections both to the switching fabric and to external client devices. In other words, a leaf switch includes fabric ports and client ports.

Some embodiments of the present invention are particularly advantageous for switch modules having multilane ports, i.e. a given port which is configured to transmit signals via a plurality of physical lanes. Accordingly, in some embodiments of the present invention, the switch module includes a first port having a first lane and a second lane, wherein the first signal is output from the switch module via the first lane, and the second signal is output from the switch module via the second lane. By distributing the first and second signals between the first and second outputs of the shuffle, which itself forms part of the switch module housing unit, signals which are output by a single port of the switch module can subsequently be directed to different destination switch modules. In other words, signals arising from a single port on the switch module are not confined to travel together to the same destination switch module. The transmission of signals from a single port to a plurality of destination switch modules is referred to as "lane breakout".

In some embodiments, the first signal and the second signal may be a first optical signal having a first wavelength and second optical signal having a second wavelength. In such cases, the switch module may make use of wavelength division multiplexing (herein "WDM") to combine the signals from the lanes into a single, first multiplexed signal, which may be conveyed via a single optical medium. In other words, the switch module may include a multiplexer configured to combine the first optical signal and the second optical signal into a first multiplexed signal. The single multiplexed signal may be carried in a single optical medium, which may be in the form of an optical fibre. However, it will be appreciated that other suitable optical media may be used.

In other embodiments, the first signal may be in the form of a first electrical signal, and the second signal may be in the form of a second electrical signal. In these cases, the switch module may still include a multiplexer configured to combine the first electrical signal and a second electrical signal into a single, first multiplexed signal.

In embodiments of the invention in which the switch module includes a multiplexer, as outlined above, the first input of the shuffle may include or be in the form of a first shuffle demultiplexer, which is configured to separate the first multiplexed signal into its constituent components, i.e. the first signal and the second signal. Then, the first signal is directed towards the first output, and the second signal is directed to the second output.

The switch module may be a first switch module and the switch module housing unit may further include a second switch module. Furthermore, the shuffle may include a second input. The second switch module may be identical to the first, i.e. it is another of the same component. The second switch module may also be configured to output a first signal and a second signal. In these embodiments, the first input may be configured to receive the first signal and the second signal from the first switch module, and correspondingly, the second input may be configured to receive the first signal and the second signal from the second switch module. As above, the first input is configured to direct the first signal from the first switch module to the first output, and the second input from the first switch module to the second output. Correspondingly, the second input is configured to direct the first signal from the second switch module to the second output, and the second signal from the second switch module to the first output. Thus, in this way, the first signal from the first switch module and the second signal from the second switch module arrive at the first output, and the first signal from the second switch module and the second signal from the first switch module arrive at the second output. Alternatively, the second input may be configured to direct the first signal from the second switch module to the first output, and the second signal from the second switch module to the second output. Thus, in this way, the first signal from the first switch module and the first signal from the second switch module arrive at the first output, and the second signal from the first switch module and the second signal from the second switch module arrive at the second output.

Thus, it can be seen that two signals each having different respective originating switch modules, may be combined at the same output of the shuffle. This allows for a greater flexibility of switching.

Like the first switch module, the second switch module may include a first port having a first lane and a second lane, wherein the first signal is output from the second switch module via the first lane and the second signal is output from the second switch module via the second lane. This is advantageous for the same reasons as in the first switch module, set out earlier in this application.

As with the first switch module, the second switch module may be configured to output a first signal and a second signal which are, respectively, a first optical signal having a first wavelength, and a second optical signal having a second wavelength. In these cases, the second switch module may also make use of WDM to combine the signals from the lanes into a single multiplexed signal, which may be conveyed via a single optical medium. In other words, the switch module may include a multiplexer configured to combine the first optical signal and the second optical signal into a single, second multiplexed signal. The second multiplexed signal may be carried in a single optical medium, which may be in the form of an optical fibre. However, it will be appreciated that other suitable optical media may be used.

In other embodiments, the second switch module may be configured to output a first signal and a second signal which are, respectively, a first electrical signal, and a second electrical signal. In these cases, the switch module may still include a multiplexer configured to combine the first electrical signal and a second electrical signal into a single, second multiplexed signal.

Thus, in some embodiments of the present invention, the first switch module is configured to output a first multiplexed signal comprising a first signal and a second signal, and the second switch module is configured to output a second multiplexed signal which also comprises a first signal and a second signal. Specifically, a first port of the first switch module is configured to output the first multiplexed signal, and a first port of the second switch module is configured to output the second multiplexed signal.

In these embodiments, the first input of the shuffle may be a first demultiplexer and the second input of the shuffle may be a second demultiplexer. The first demultiplexer may be configured to split the first multiplexed signal into its constituent components, and to direct the first signal to the first output and the second signal to the second output. The second demultiplexer may be configured to split the second multiplexed signal into its constituent components, and to direct the first signal to the second output and the second signal to the first output.

The first output may include a first output multiplexer configured to combine the first signal of the first multiplexed signal and the second signal of the second multiplexed signal into a first multiplexed fabric signal. The first output multiplexer may then be configured to direct the first multiplexed fabric signal to the switching fabric. Similarly, the second output may include a second output multiplexer configured to combine the first signal of the second multiplexed signal and the second signal of the first multiplexed signal into a second multiplexed fabric signal. The second output multiplexer may then be configured to direct the second multiplexed fabric signal to the switching fabric.

The switch module housing unit may include more than two switch modules. Alternatively put, the switch module housing unit may include a plurality of switch modules. In some embodiments, the plurality of switch modules are identical or substantially identical components, differing only in their operation and the components to which they are connected.

In some embodiments, there may be more than a first switch module and a second switch module. In other words, each switch module housing unit may include a plurality of switch modules, including at least the first switch module and the second switch module. In such cases, each of the plurality of switch modules may include a first port, each first port being configured to output a plurality of signals. Specifically, each of the first ports includes a plurality of lanes, wherein the first port is configured to output each of the plurality of signals via a respective lane of the plurality of lanes. The lanes may be physical lanes, and the term "lanes" may refer throughout this application to optical lanes, which may or may not correspond to the number of electrical lanes per port. In some embodiments each of the plurality of switch modules are identical to each other, i.e. there are several of the same component, differing only in how they are connected to other components, and how they operate. In some embodiments, the number of switch modules in the plurality of switch modules is no more than the number of lanes in the plurality of lanes. In some embodiments, the number of switch modules in the plurality of switch modules is the same as the number of lanes in the plurality of lanes. The following description focuses on the embodiments in which this is true.

The shuffle may include a plurality of inputs. The number of inputs in the plurality of inputs being the same as the number of lanes in the plurality of lanes and the switch modules in the plurality of switch modules. Each input may be arranged to receive the plurality of signals from a respective one of the plurality of switch modules. The shuffle may also include a plurality of outputs, the number of outputs in the plurality of outputs being, in some embodiments, the same as the number of inputs in the plurality of inputs. Each of the plurality of inputs is then configured to direct each of the plurality of signals to a different respective output. The plurality of inputs may be configured to direct the plurality of signals to the plurality of the outputs in a cyclic manner. This will be explained in more detail shortly, with reference to WDM of optical signals.

Each of the plurality of signals may be an optical signal having a respective wavelength. Each of the switch modules in the plurality of switch modules may use the same set of wavelengths for its respective plurality of signals. Accordingly, each of the plurality of switch modules may include a multiplexer configured to combine the respective plurality of optical signals into a single multiplexed signal, which may be carried in a respective optical medium, such as an optical fibre.

Alternatively, each of the plurality of switch modules may be configured to output a respective plurality of signals which are a plurality of electrical signals. In these cases, each of the switch modules may still include a respective multiplexer configured to combine the respective plurality of electrical signals into a single respective multiplexed signal.

In other words, in some embodiments of the present invention, each of the plurality of switch modules is configured to output a respective multiplexed signal. Specifically, a respective first port of each of the plurality of switch modules is configured to output a respective multiplexed signal. Accordingly, the plurality of inputs of the shuffle may be in the form of a plurality of demultiplexers, each configured to split a respective multiplexed signal into its constituent plurality of signals. Each of the plurality of demultiplexers is configured to direct each of the constituent plurality of signals towards a respective output of the shuffle. In some embodiments, the plurality of outputs of the shuffle may be in the form of a plurality of output multiplexers. Each of the plurality of output multiplexers may be configured to combine the plurality of signals arriving at it, into a single multiplexed fabric signal.

When the signals are optical, they can only be multiplexed together if each signal to be multiplexed has a different wavelength. Otherwise, interference between signals having the same wavelength can lead to decreased signal quality. In these embodiments, it is necessary to ensure that the plurality of signals arriving at a given output multiplexer all have different wavelengths. This can be done by ensuring that the each of the plurality of demultiplexers are configured to direct its respective plurality of signals to the output multiplexers in a cyclic manner. For example, consider the case in which there are four signals having wavelengths $\lambda_1$, $\lambda_2$, $\lambda_3$ and $\lambda_4$. In this case, there would be four input demultiplexers and four output multiplexers. The table below illustrates where each of the optical signals may be sent from each of the demultiplexers. As it can be seen, each of the demultiplexers outputs four different wavelength signals, and each multiplexer receives four signals having different wavelengths. The skilled person will appreciate that this cyclic combination of optical signals can be extended to embodiments having more than four demultiplexers/multiplexers in the shuffle.

|       | DEMUX1      | DEMUX2      | DEMUX3      | DEMUX4      |
|-------|-------------|-------------|-------------|-------------|
| MUX1  | $\lambda_1$ | $\lambda_4$ | $\lambda_3$ | $\lambda_2$ |
| MUX2  | $\lambda_2$ | $\lambda_1$ | $\lambda_4$ | $\lambda_3$ |
| MUX3  | $\lambda_3$ | $\lambda_2$ | $\lambda_1$ | $\lambda_4$ |
| MUX4  | $\lambda_4$ | $\lambda_3$ | $\lambda_2$ | $\lambda_1$ |

A given switch module may be connected to a plurality of multiplexers, and thus be configured to output a plurality of multiplexed signals.

As the skilled person will note, the above description is centred on embodiments in which each switch module includes only a single port. However, the invention may be extended to embodiments in which each switch module includes more than one port. Consider for example, the case where the first switch module includes a first port and a second port, and the second switch module also includes a first port and a second port. In such embodiments, we define a "set of first ports" and a "set of second ports". The set of first ports includes the first port of the first switch module and the first port of the second switch module. Similarly, the set of second ports includes the second port of the first switch module and the second port of the second switch module. In embodiments in which there are more than two switch modules, the set of first ports includes the first port of each switch module, and the set of second ports includes the second port of each switch module. These are discussed in more depth later in this application. It should be noted that the features of the first ports, as previously discussed, apply equally well to the second ports.

In embodiments in which the first switch module and the second switch module each include a first port and a second port, the switch module housing unit may include a first shuffle and a second shuffle. The first shuffle is configured to shuffle signals originating from the set of first ports and the second shuffle is configured to shuffle signals originating from the set of second ports. The first shuffle is then equivalent to the shuffles described in detail above, which serves the first ports only. The second shuffle is the same as the first differing only in that its inputs receive signals from the set of second ports, rather than the set of first ports. For brevity, the full description of the second shuffle will not be repeated here, but the skilled person appreciates that all of the features described above with respect to the shuffle may apply equally well for the first and/or second shuffle.

Whereas in some embodiments, the switch module housing unit may include a separate first shuffle and second shuffle, in other embodiments, the first shuffle and second shuffle may be part of the same component. Specifically, a shuffle may include a first set of inputs configured to receive signals from the set of first ports, and a second set of inputs, configured to receive signals from the set of second ports. Similarly, the shuffle may include a first set of outputs configured to receive signals from the first set of inputs, and a second set of outputs configured to receive signals from the second set of inputs. Collectively, the first set of inputs and the first set of outputs may be referred to as the "first set of shuffle components", and the second set of inputs and the second set of outputs may be referred to as the "second set of shuffle components". The connections between and operations of the set of first ports and the first set of shuffle components may be the same as the operation of the first shuffle described above. Similarly, the connections between and operations of the set of second ports and the second set of shuffle components may be the same as the operation of the first shuffle described above and, accordingly, the second shuffle.

In some embodiments of the present invention, each of the switch modules may include more than two ports. Accordingly, each switch module may include a plurality of ports, including a first port, second port etc. We can still define the "set of first ports" etc. as above. When there is a plurality of ports on each switch module, the switch module housing unit may include a plurality of shuffles, each configured to shuffle signals originating from a respective set of ports. Each of the plurality of shuffles may be as discussed above.

As discussed above in the case where there are two shuffles, the plurality of shuffles may be separate components, or may be part of the same component. Specifically, a shuffles may include a plurality of sets of inputs, each set of inputs configured to receive signals from a respective set of ports. The shuffle may further include a plurality of sets of outputs, each set of outputs configured to receive signals from the respective plurality of inputs. Thus, to use the definition formulated earlier, the shuffle may include a plurality of sets of shuffle components.

The description of some embodiments of the invention above focuses on what may be described as the "fabric-facing" configuration, in which some embodiments of the invention are described with reference to embodiments in which signals are being sent from switch module to fabric, via the wavelength shuffle. However, the same components can be described with reference to signals travelling in the opposite direction. Effectively, when describing embodiments of the invention in these terms, the inputs become outputs and vice versa. For completeness, however, this is described in detail below.

Accordingly a second aspect of some embodiments of the present invention provides a switch for switching a signal between a source client device and a destination client device, the switch including: a switch module housing unit, including:

a shuffle including:
a first input,
a second input, and
a first output, wherein the first input is configured to receive a first signal and direct it to the first output, and the second input is configured to receive a second signal and direct it to the first output; and a switch module configured to receive the first and second signal from the first output of the wavelength shuffle.

In some embodiments of the second aspect of the invention, the switch may include a plurality of switch module housing units, between which signals may be switched.

Specifically, the switch may include a first switch module housing unit and a second switch module housing unit, each including at least one switch module and, in some embodiments, a plurality of switch modules. In some embodiments, the switch includes a switching fabric, and the first input and second input may be configured, respectively, to receive the first signal and the second signal from the switching fabric. The term switching fabric has the same definition as used earlier in this application.

The first switch module housing unit may be in the form of a spine switch module housing unit, and the switch module may be a spine switch module (as defined earlier in this application). Alternatively, the first switch module housing unit may be in the form of a leaf switch module housing unit, and the switch module may be a leaf switch module (as defined earlier in this application).

As discussed previously, some embodiments of the present invention are particularly advantageous for switch modules having multilane ports. So, in some embodiments of the present invention, the switch module includes a first port including a first lane and a second lane, wherein the first signal is received by the switch module via the first lane, and the second signal is received by the switch module via the second lane. In this way, signals originating from different source switch modules are able to be directed to the same spine switch module (or leaf switch module). This may be referred to as "reverse lane breakout", or may occur after lane breakout has occurred to "reunite" all of the signals from an initial port at the same switch module, after they have traversed the fabric.

As before, in some embodiments, the first signal and the second signal may be a first optical signal having a first wavelength and a second optical signal having a second wavelength. In such cases, the switch module may make use of WDM to combine and separate signals. In such cases, the first output of the wavelength shuffle may include or be in the form of a first shuffle multiplexer, which is configured to combine the first signal (from the first input) and the second signal (from the second input) into a first multiplexed signal, which is then output to the switch module. The first multiplexed signal may then be conveyed via a single optical medium, e.g., in the form of an optical fibre. However, as before, it will be appreciated that other suitable optical media may be used.

Accordingly, in such embodiments, the switch module may include a demultiplexer which is configured to separate the first multiplexed signal into its constituent signals, i.e. the first signal and the second signal.

In other embodiments, the first signal may be in the form of a first electrical signal and the second signal may be in the form of a second electrical signal. In these cases, the switch module and the shuffle may still include, respectively, a demultiplexer and multiplexer in order to perform the same function.

The switch module may be a first switch module and the switch module housing unit may further include a second switch module. Accordingly, the shuffle may include a second output. The second switch module may be identical to the first, i.e. it is another of the same component. The second switch module may be configured to receive a first signal and a second signal from the second output. In such embodiments, the first input of the shuffle may be configured to receive a first signal and a second signal, and to direct the first signal to the first output and the second signal to the second output. The second input of the shuffle may also be configured to receive a first signal and a second signal, and to direct the second signal to the first output, and the first signal to the second output. Thus, the first output is configured to receive the first signal from the first input and the second signal from the second input, and to output these signals to the first switch module. And, the second output is configured to receive the first signal from the second output, and the second signal from the first input, and to output these signals to the second switch module.

From the above, it becomes clear that signals arriving at different inputs of the shuffle can be directed towards different switch modules.

Alternatively, the second input may be configured to receive a first signal and a second signal and to direct the first signal to the first output and the second signal to the second output. In this way, the first output receives the first signal from the first input and the first signal from the second input, and the second output receives the second signal from the first input and the second signal from the first input. Using this labelling, it is complicated to describe the cyclic nature of some embodiments of the present invention, so in the following, we stick to the previous embodiment.

As with the first switch module, the second switch module may include a first port having a first lane and a second lane, wherein the second switch module is configured to receive the first signal from the second output via the first lane, and the second signal, also from the second output, via the second lane. This is advantageous for the same reasons as in the first switch module.

Like the first switch module, the second switch module may be configured to receive a first signal and a second signal which are, respectively, a first optical signal having a first wavelength, and a second optical signal having a second wavelength. In these cases, WDM may also be employed in embodiments of the second aspect of the invention.

In such cases, the second output of the wavelength shuffle may include or be in the form of a first shuffle multiplexer, which is configured to combine the first signal from the second input and the second signal from the first input into a second multiplexed signal, which is then output to the second switch module, from the second output. The second multiplexed signal may then be conveyed via a single optical medium, e.g., in the form of an optical fibre. However, as before, it will be appreciated that other suitable optical media may be used.

Accordingly, in such embodiments, the second switch module may include a demultiplexer which is configured to separate the second multiplexed signal into its constituent signals, i.e. the first signal and the second signal.

In other embodiments, the first signal may be in the form of a first electrical signal and the second signal may be in the form of a second electrical signal. In these cases, the switch module and the shuffle may still include, respectively, a demultiplexer and multiplexer in order to perform the same function.

To summarize, in certain embodiments of the second aspect of the present invention, the first switch module is configured to receive a first multiplexed signal comprising a first signal and a second signal, and the second switch module is configured to receive a second multiplexed signal which also comprises a first signal and a second signal. More specifically, a first port of the first switch module is configured to receive the first signal, and a first port of the second signal is configured to output the second multiplexed signal.

In order to achieve this, the first output of the shuffle box may include, or be in the form of a first multiplexer and the second output of the shuffle may include, or be in the form of a second multiplexer. The first multiplexer may be configured to combine the first signal from the first input and the second signal from the second input to generate the first multiplexed signal, and the second multiplexer may be configured to combine the second signal from the first input and the first signal from the second input to generate the second multiplexed signal.

We consider now the inputs of the shuffle, which are configured to receive signals from the switching fabric. The first input of the shuffle may be configured to receive a first multiplexed fabric signal, and the second input of the shuffle may be configured to receive a second multiplexed fabric signal. In these embodiments, the first input of the shuffle may include, or be in the form of, a first input demultiplexer which is configured to separate the first multiplexed fabric signal into a first signal and a second signal. Similarly, the second input of the shuffle may include, or be in the form of a second input demultiplexer which is configured to separate the second multiplexed fabric signal into a first signal and a second signal. In this way, multiplexed signals which are transmitted via the switching fabric can be split into their constituent signals at the inputs of the shuffle, and those constituent signals may then be directed towards different respective switch modules.

The above embodiments define the second aspect of some embodiments of the invention in terms of only two switch modules. However, it will be appreciated that the switch module housing unit may include a plurality of switch modules. In some embodiments, the plurality of switch modules are identical, or substantially identical components, differing only in their operation and the components to which they are connected. In these cases, each of the plurality of switch modules may include a first port, each first port being configured to receive a plurality of signals. Specifically, each of the first ports may include a plurality of lanes, wherein the first port is configured to receive each of the plurality of signals via a respective lane of the plurality of lanes. The lanes may be physical lanes. Like the first switch module and the second switch module, in some embodiments each of the plurality of switch modules are identical to each other, i.e. there are several of the same component, differing only in how they are connected to other components, and how they operate. In some embodiments, the number of switch modules in the plurality of switch modules is no more than the number of lanes in the plurality of lanes. In some embodiments, the number of switch modules in the plurality of switch modules is the same as the number of lanes in the plurality of lanes. The following description focuses on embodiments of the second aspect of the invention for which this is true.

The shuffle may include a plurality of outputs, wherein the number of outputs in the plurality of outputs is the same as the number of lanes in the plurality of lanes and the switch modules in the plurality of switch modules. Each switch module may be arranged to receive a plurality of signals from a respective output of the shuffle. The shuffle also may include a plurality of inputs, wherein the number of inputs in the plurality of inputs may be the same as the number of outputs in the plurality of outputs. Each of the plurality of outputs is configured to receive a plurality of signals, each signal of the plurality of signals being received from a different, respective input of the plurality of inputs. Alternatively put, each input of plurality of inputs is configured to direct each of a plurality of signals to a different, respective output of the plurality of outputs. The plurality of inputs may be arranged to direct the plurality of signals to the plurality of outputs in a cyclic manner, explained in more detail below.

Each of the plurality of signals may be an optical signal having a respective wavelength. Each of the switch modules in the plurality of switch modules may use the same set of wavelength for its respective plurality of signals. Each of the inputs of the shuffle may be configured to receive a respective multiplexed signal. Specifically, a respective first port of each of the plurality of modules is configured to receive a respective multiplexed signal. Each switch module, and more specifically a respective first port of each switch module may include a respective demultiplexer, which is configured to separate the respective multiplexed signal arriving at the first port into its constituent plurality of signals.

In order to bring this about, each output of the plurality of outputs may include or be in the form of a multiplexer, each configured to combine a respective plurality of signals arriving at that input into a respective multiplexed signal, which is then directed towards a respective first port of a respective switch module. Each multiplexed signal may be carried in a respective optical medium, such as an optical fibre.

Each input of the plurality of inputs of the shuffle may be arranged to receive a respective multiplexed fabric signal from the switching fabric, wherein the respective multiplexed fabric signal comprises a plurality of individual signals. Each of the inputs of the plurality of inputs of the shuffle may include or be in the form of a demultiplexer, configured to separate the plurality of signals received at that input into its constituent plurality of signals. Each input of the plurality of inputs of the shuffle is then configured to direct each of the plurality of signals to a different, respective output of the plurality of outputs of the shuffle.

When the signals are optical, they can only be multiplexed together if each signal to be multiplexed has a different wavelength. Otherwise, interference between signals having the same wavelength can lead to decreased signal quality. In these embodiments, it is important to ensure that the plurality of signals arriving at a given multiplexer (i.e. at an output of the plurality of outputs of the shuffle) has a different wavelength. This can be done by ensuring that each of the input demultiplexers are configured to direct its respective plurality of signals to the plurality of output multiplexers in a cyclic manner. For example, consider the case in which there are four signals having wavelengths $\lambda_1$, $\lambda_2$, $\lambda_3$ and $\lambda_4$. In this case, there would be four input demultiplexers and four output multiplexers. The table below illustrates where each of the optical signals may be sent from each of the demultiplexers. As it can be seen, each of the demultiplexers outputs four different wavelength signals, and each multiplexer receives four signals having different wavelengths. The skilled person will appreciate that this cyclic combination of optical signals can be extended to embodiments having more than four demultiplexers/multiplexers in the shuffle.

|  | DEMUX1 | DEMUX2 | DEMUX3 | DEMUX4 |
| --- | --- | --- | --- | --- |
| MUX1 | $\lambda_1$ | $\lambda_4$ | $\lambda_3$ | $\lambda_2$ |
| MUX2 | $\lambda_2$ | $\lambda_1$ | $\lambda_4$ | $\lambda_3$ |
| MUX3 | $\lambda_3$ | $\lambda_2$ | $\lambda_1$ | $\lambda_4$ |
| MUX4 | $\lambda_4$ | $\lambda_3$ | $\lambda_2$ | $\lambda_1$ |

A given switch module may be connected to a plurality of multiplexers and thus configured to receive a plurality of multiplexed signals.

As the skilled person will note, the above description is centred on embodiments in which each switch module includes only a single port. However, the invention may be extended to embodiments in which each switch module includes more than one port. Consider for example the case where the first switch module includes a first port and a second port, and the second switch module also includes a first port and a second port. In such embodiments, we define a "set of first ports" and a "set of second ports". The set of first ports includes the first port of the first switch module and the first port of the second switch module. Similarly, the set of second ports includes the second port of the first switch module and the second port of the first switch module. In embodiments in which there are more than two switch modules, the set of first ports includes the first port of each switch module, and the set of second ports includes the second port of each switch module.

In embodiments in which the first switch module and the second switch module each include a first port and a second port, the switch module housing unit may include a first shuffle and a second shuffle. The first shuffle is configured to shuffle signals destined for the set of first ports, and the second shuffle is configured to shuffle signals destined for the set of second ports. The first shuffle is then equivalent to the shuffles described in detail above, but serves the first ports only. The second shuffle is the same as the first, differing only in that its outputs are configured to direct signals to the set of second ports, rather than the set of first ports. For brevity, the full description of the second shuffle will not be repeated here, but the skilled person appreciates that all of the features described above with respect to the shuffle may apply equally well for the first and/or second shuffle.

Whereas in some embodiments, the switch module housing unit may include a separate first shuffle and second shuffle, in other embodiments, the first shuffle and second shuffle may be part of the same component. Specifically, a shuffle may include a first set of outputs configured to direct signals to the set of first ports, and a second set of inputs, configured to direct signals to the set of second ports. Similarly, the shuffle may include a first set of outputs configured to receive signals from the first set of inputs, and a second set of outputs configured to receive signals from the second set of inputs. Collectively, the first set of inputs and the first set of outputs may be referred to as the "first set of shuffle components", and the second set of inputs and the second set of outputs may be referred to as the "second set of shuffle components". The connections between and operations of the set of first ports and the first set of shuffle components may be the same as the operation of the first shuffle described above. Similarly, the connections between and operations of the set of second ports and the second set of shuffle components may be the same as the operation of the first shuffle described above and, accordingly, the second shuffle.

In some embodiments of the present invention, each of the switch modules may include more than two ports. Accordingly, each switch module may include a plurality of ports, including a first port, second port etc. We can still define the "set of first ports" etc. as above. When there is a plurality of ports on each switch module, the switch module housing unit may include a plurality of shuffles, each configured to shuffle signals destined for a respective set of ports. Each of the plurality of shuffles may be as discussed above.

As discussed above in the case where there are two shuffles, the plurality of shuffles may be separate components, or may be part of the same component. Specifically, a shuffle may include a plurality of sets of inputs, each set of inputs configured to receive signals from a respective set of ports. The shuffle may further include a plurality of sets of outputs, each set of outputs configured to receive signals from the respective plurality of inputs. Thus, to use the definition formulated earlier, the shuffle may include a plurality of sets of shuffle components.

The above aspects of some embodiments of the present invention relate to switches which are configured to operate in a specific manner in order to provide the advantages of some embodiments of the present invention. As will be appreciated, however, some embodiments of the invention do not rest solely in the hardware, but also the method.

Accordingly, a third aspect of some embodiments of the present invention provides a method of switching a signal from a source client device to a destination client device, the method including the steps of: receiving at a first input of a shuffle, a first signal and a second signal, the first signal and the second signal received from a switch module; directing the first signal to a first output of the shuffle; and directing the second signal to a second output of the shuffle. The skilled person will appreciate that the optional features set out in detail above, with reference to the first aspect of some embodiments of the invention may apply equally well to the third aspect of some embodiments of the invention. Many of the optional features of the first aspect of some embodiments of the invention are directed towards specific functions which the various components of the switch may be configured to perform, and it will thus be appreciated that embodiments of methods of the third aspect of some embodiments of the invention may include any combination of these optional functional features. It will be readily apparent that methods of the third aspect of some embodiments of the invention may be performed by a switch according to the first aspect of some embodiments of the invention, and accordingly, optional structural features set out with reference to the first aspect of some embodiments of the invention may also apply to methods of the third aspect of some embodiments of the invention. For conciseness, and to avoid unnecessary repetition, these optional features will not be set out again here.

The method in the previous paragraph refers to the "downward-direction" switching, but a fourth aspect of some embodiments of the present invention may provide a method of "upward-direction" switching. Specifically, a fourth aspect of some embodiments of the present invention may provide a method of switching a signal from a source client device to a destination client device, the method including the steps of: receiving, at a first input of a shuffle, a first signal; receiving at a second input of a shuffle, a second signal; directing the first signal and the second signal to a first output of the shuffle; and directing the first signal and the second signal to a switch module. The skilled person will appreciate that the optional features set out in detail above, with reference to the second aspect of some embodiments of the invention, may apply equally well to some embodiments of the fourth aspect of the invention. Many of the optional features of some embodiments of the second aspect of the invention are directed towards specific functions which the various components of the switch may be configured to perform, and it will thus be appreciated that embodiments of methods of the fourth aspect of the invention may include any combination of these optional functional features. It will be readily apparent that methods of the fourth aspect of some embodiments of the invention may be performed by a switch according to the second aspect of some embodiments of the invention, and accordingly, optional structural features set out with reference to the second aspect of some embodiments of the invention may also apply to methods of the fourth aspect of some embodiments of the invention. For conciseness, and to avoid unnecessary repetition, these optional features will not be set out again here.

BRIEF DESCRIPTION OF THE DRAWINGS

The present invention will now be described with reference to the accompanying drawings, in which.

DETAILED DESCRIPTION

Figure 1:
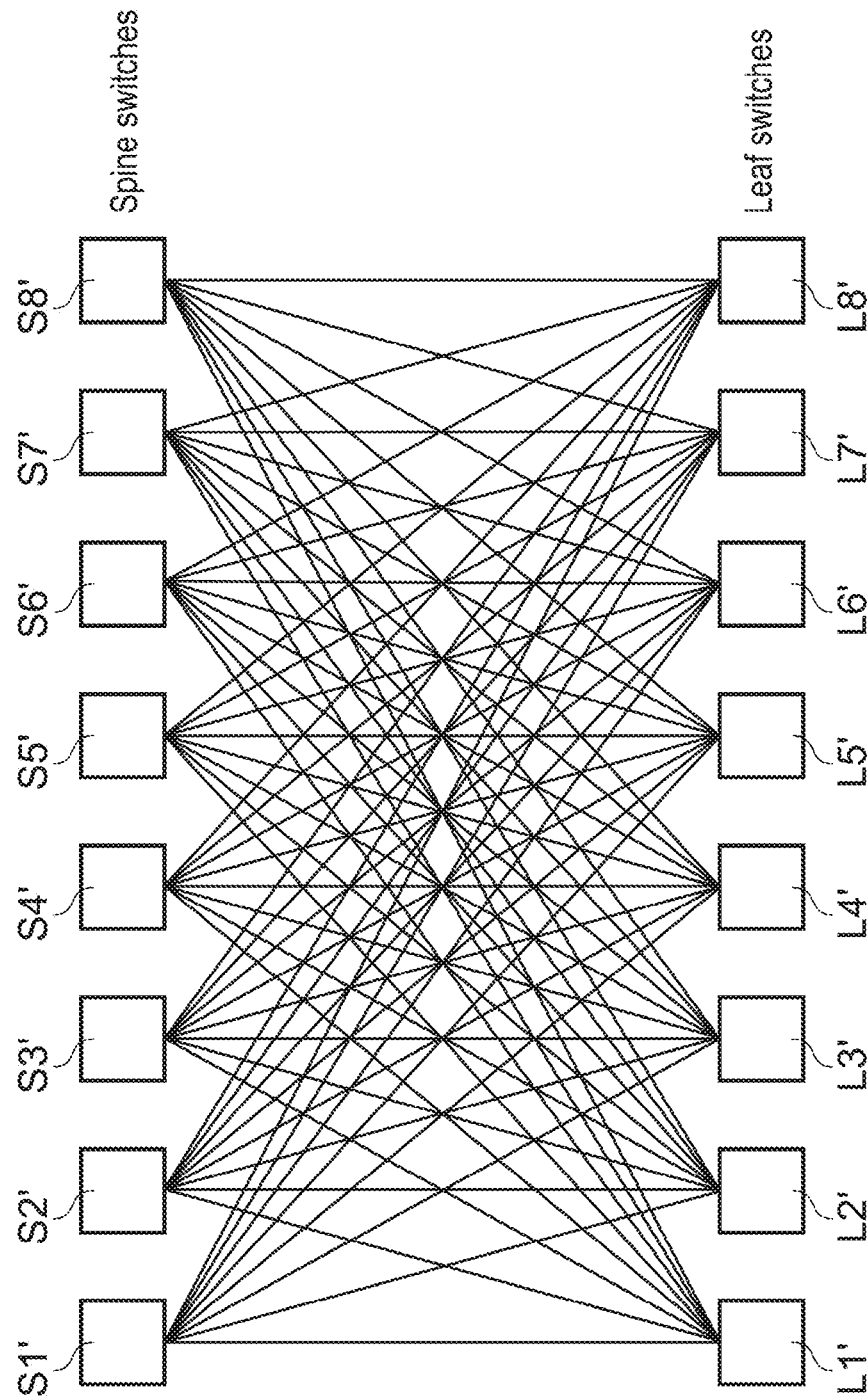
FIG. 1 shows an example of a folded Clos topology.

FIG. 1 shows an example of how a set of spine switches and leaf switches may be interconnected in a folded Clos topology. In this arrangement, there are eight leaf switch modules L1' to L8' and eight spine switch modules S1' to S8'. As with some embodiments of the present invention, each of the switch modules S1' may be a substantially identical components which is programmed to operate as either a spine switch or a leaf switch. Between the spine switch modules and the leaf switch modules there is a switching fabric. In the topology shown in FIG. 1, the switching fabric includes a full-mesh interconnect, providing a connection between every leaf switch module to every spine switch module, and vice versa. Providing a full-mesh interconnect in this way ensures that signals can be switched between the leaf switch modules and spine switch modules in a non-blocking manner.

Figure 2A:
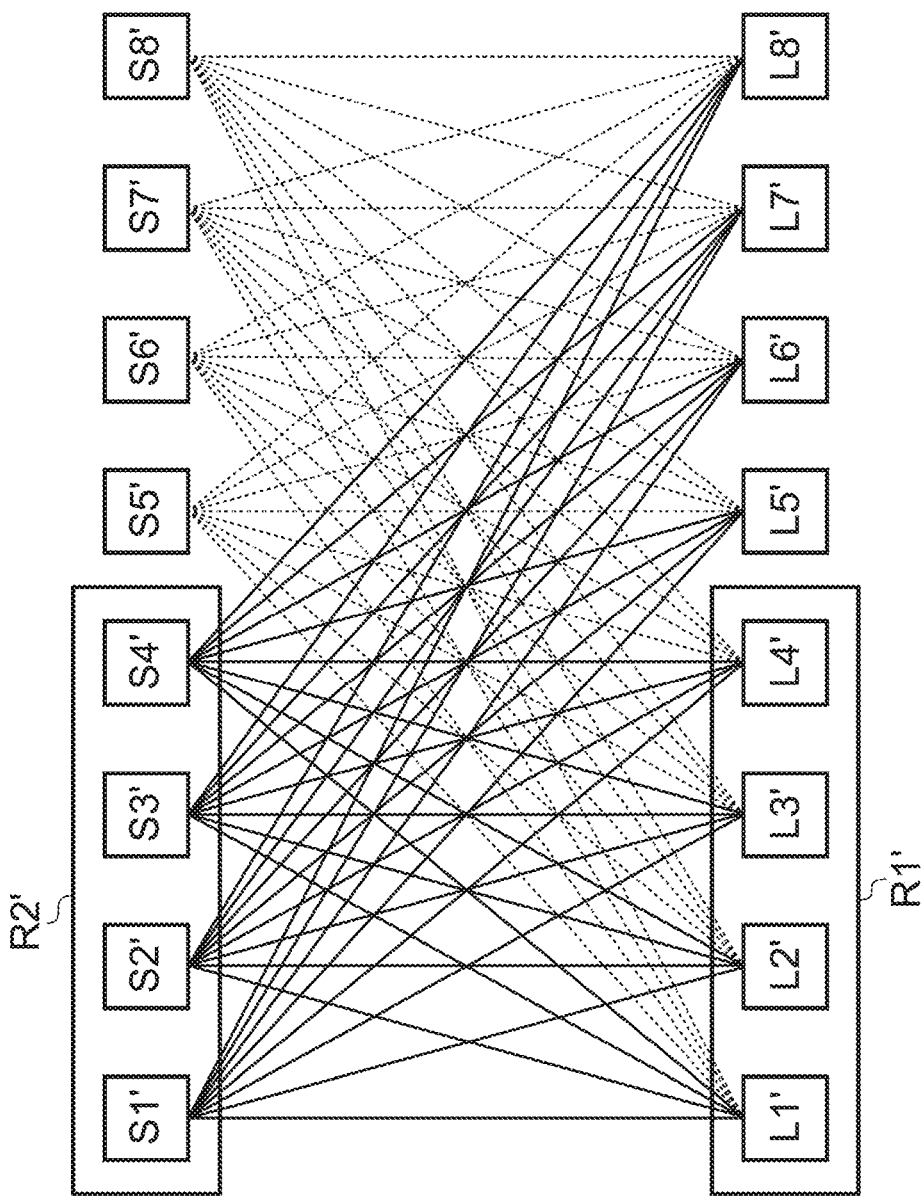
FIG. 2A shows the folded Clos topology of FIG. 1 partitioned into separate switch module housing units.
Figure 2B:
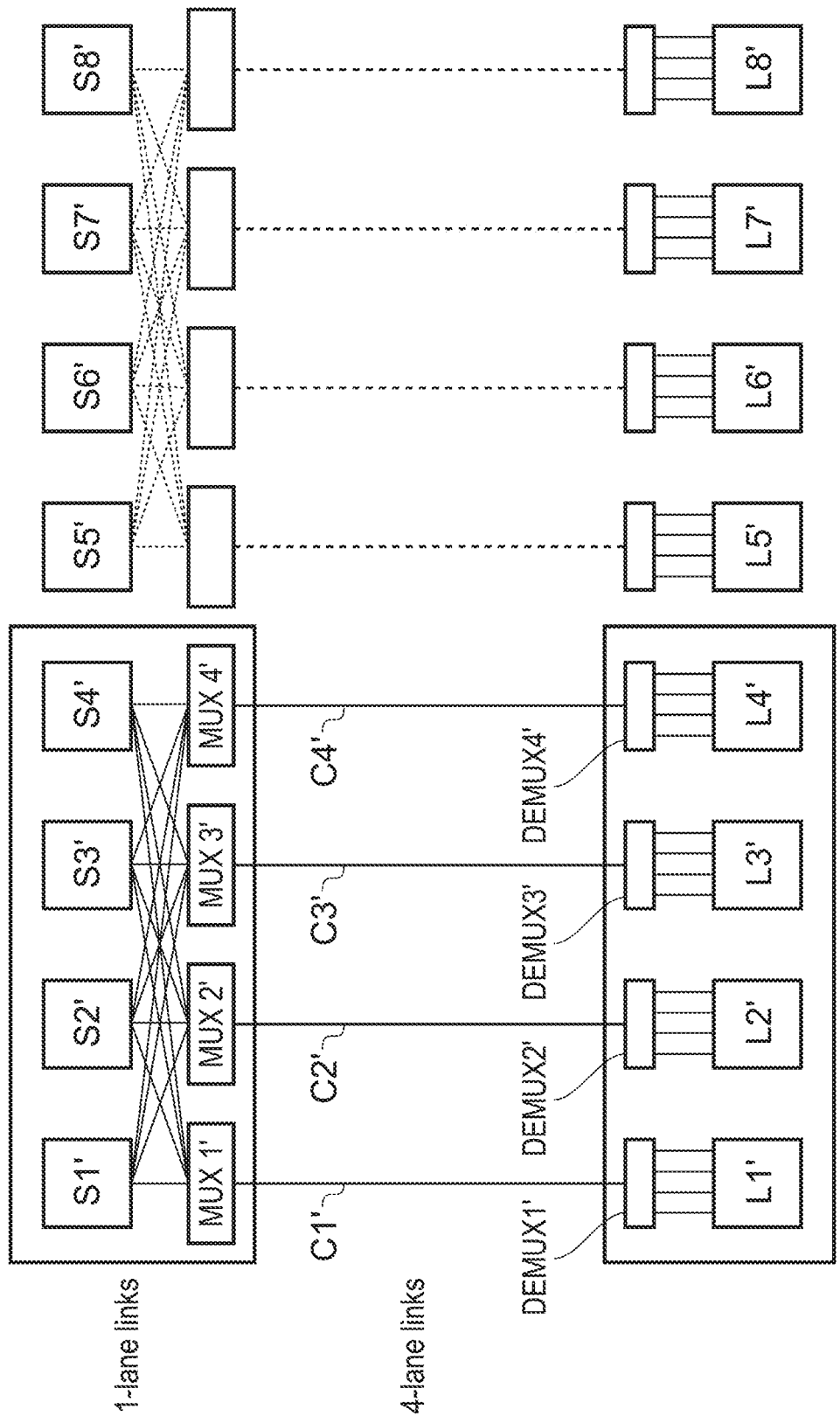
FIG. 2B shows the arrangement of FIG. 2A including a distributed multiplexer-demultiplexer layer.

FIGS. 2A and 2B illustrate how the connections among two groups of switch modules (one of four leaf switch modules L1' to L4' and one of four spine switch modules S1' to S4') can be consolidated. In FIG. 2A, the groups into which the switch modules are divided are shown in boxes R1' and R2'. These boxes R1' and R2' may be considered to represent switch module housing units R1' and R2' into which the switch modules may be arranged in a real-world implementation. In the arrangement shown in FIG. 1, each leaf switch module L1' to L8' still includes a connection to each spine switch module S1' to S8'. FIG. 2B illustrates an arrangement in which the vast array of fibres in the switching fabric is greatly reduced to just four multi-fibre cables (PSM), or alternatively, multi-wavelength cables (WDM).

This is achieved by using a distributed multiplexer-demultiplexer layer. The multiplexer layer includes four multiplexers MUX1' to MUX4' which are located on spine switch module housing unit SR1'. Each spine switch S1' to S4' includes a connection to each of the multiplexers MUX1' to MUX4'. Alternatively put, each of the multiplexers MUX1' to MUX4' is configured to receive a signal from each of the spine switches S1' to S4'. The signals received at the multiplexers MUX1' to MUX4' are then combined (i.e. multiplexed) and transmitted towards the demultiplexer layer in one of cables C1' to C4'. Then, the signals are split back into the four original signals by the demultiplexers DEMUX1' to DEMUX4', and transmitted onwards to one of the leaf switch modules L1' to L4'. As the skilled person will readily appreciate, the same process may operate in reverse, when transmitting a signal from a leaf switch module to a spine switch module.

The multiplexers MUX1' to MUX4' and the demultiplexers DEMUX1' to DEMUX4' still enable the full-mesh interconnectivity between leaf switch modules L1' to L4' and the spine switch modules S1' to S4', but the number of physical cables C1' to C4' required is greatly reduced.

Figure 3:
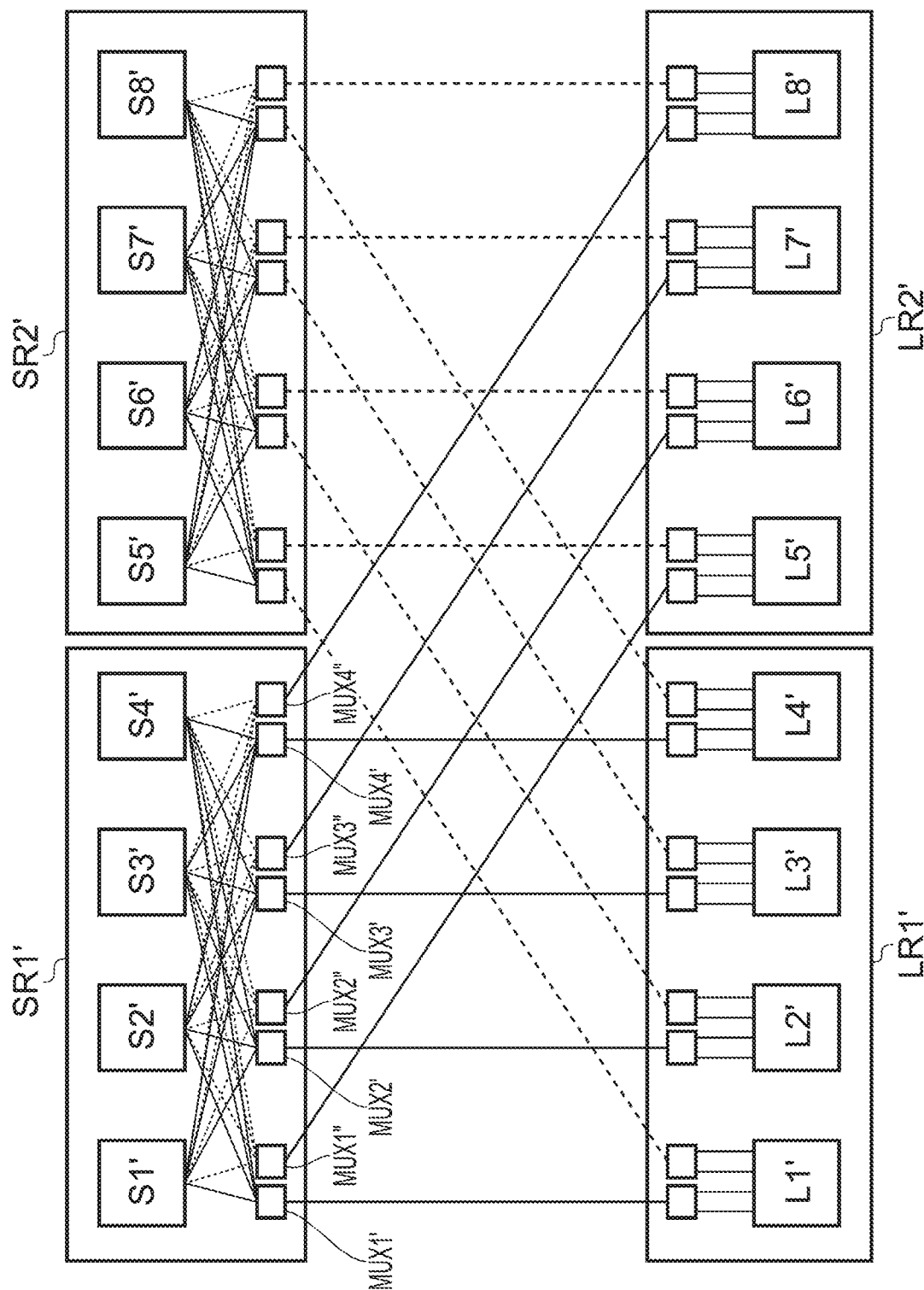
FIG. 3 shows a similar arrangement to FIG. 2B with a higher degree of interconnectivity.

FIG. 3 goes one step further. Here, while still dividing the leaf switch modules L1' to L8' into two leaf switch module housing units LR1' and LR2', and the spine switch modules S1' to S8' into two spine switch module housing units SR1' and SR2', full-mesh interconnectivity is provided between all eight of the leaf and spine switch modules with a greatly reduced fibre count, relative to the arrangement shown in FIG. 2A.

This is achieved in FIG. 3 by including two multiplexers e.g. MUX1' and MUX1" connected to each spine switch module S1' to S8'. One of the multiplexers MUX1' associated with each spine switch is connected to a leaf switch module L1' on leaf switch module housing unit LR1', and the other MUX1" is connected to a leaf switch module L4 on leaf switch module housing unit LR2'. It will be appreciated that by including the distributed multiplexer-demultiplexer layers, the physical cable count can be reduced from sixty four in FIG. 2A to just sixteen in FIG. 3, with no loss of connectivity.

The arrangements of FIGS. 2A to 3 are described in more detail in WO 2018/162978 A1 ("Optoelectronic switch with reduced fibre count") by the same applicant.

Figure 4:
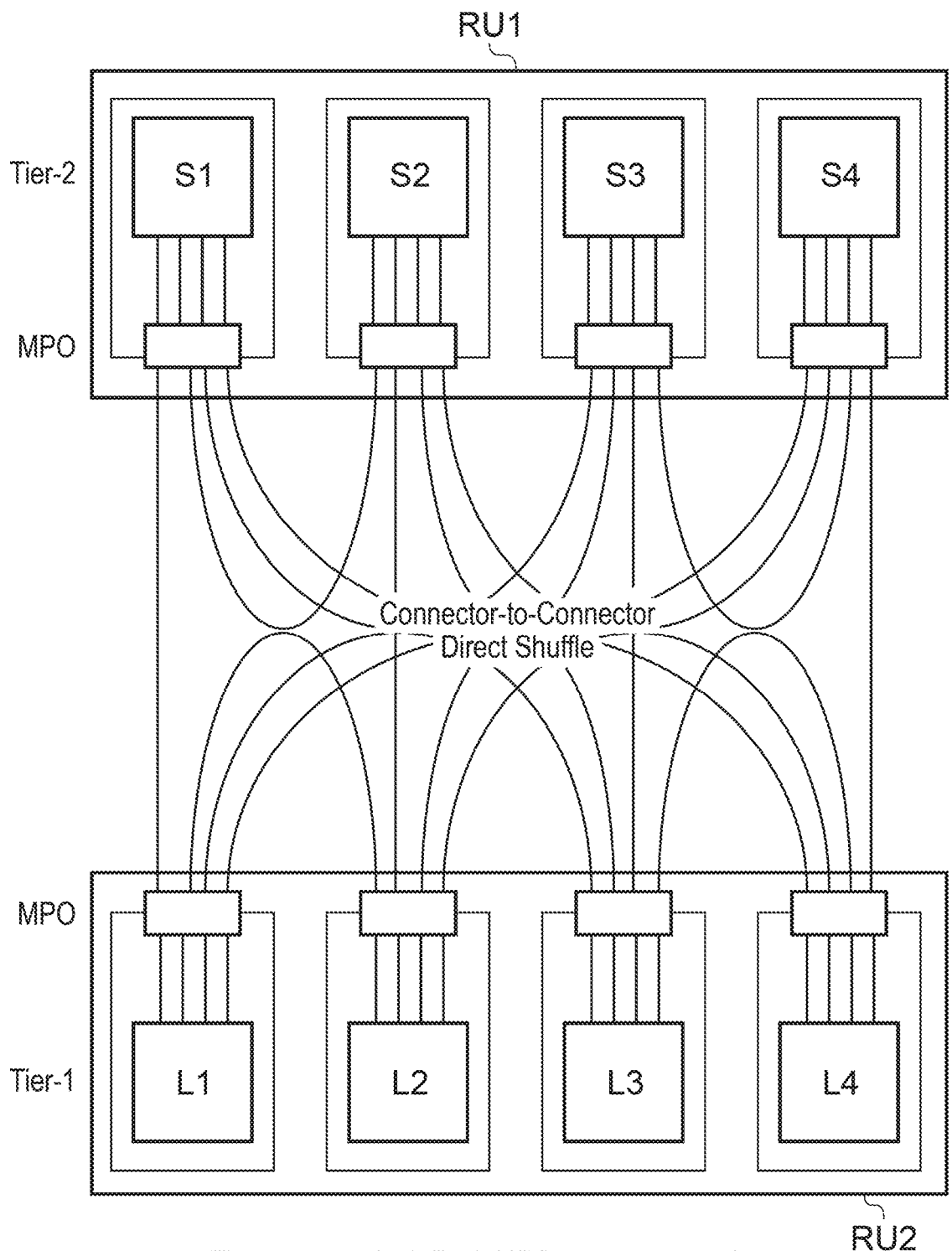
FIG. 4 shows a prior art arrangement with a direct connector-to-connector shuffle.

Some embodiments of the present invention differ from the arrangements shown in FIGS. 2B and 3 in that it includes a shuffle box on one of the switch module housing units, which is able to perform an additional layer of switching before the signals enter the fibre shuffle. FIG. 4 illustrates another prior art case in which connections from each of the Tier-2 switch modules (which may be spine switch modules or leaf switch modules) S1 to S4, located on the Tier-2 switch module housing unit RU1 has four ports each having a connection to each of the Tier-1 ports L1 to L4 on the Tier-1 switch module housing unit RU2. This requires sixteen individual connections to provide full mesh connectivity. Because the four connections emerging from each of the Tier-1 (or Tier-2) switch modules L1 to L4 (or S1 to S4) are each directed to a different destination switch module, it is not possible to combine these physical connections into e.g. multi-fibre cables, and thus the switching fabric is sprawling and complex.

Figure 5:
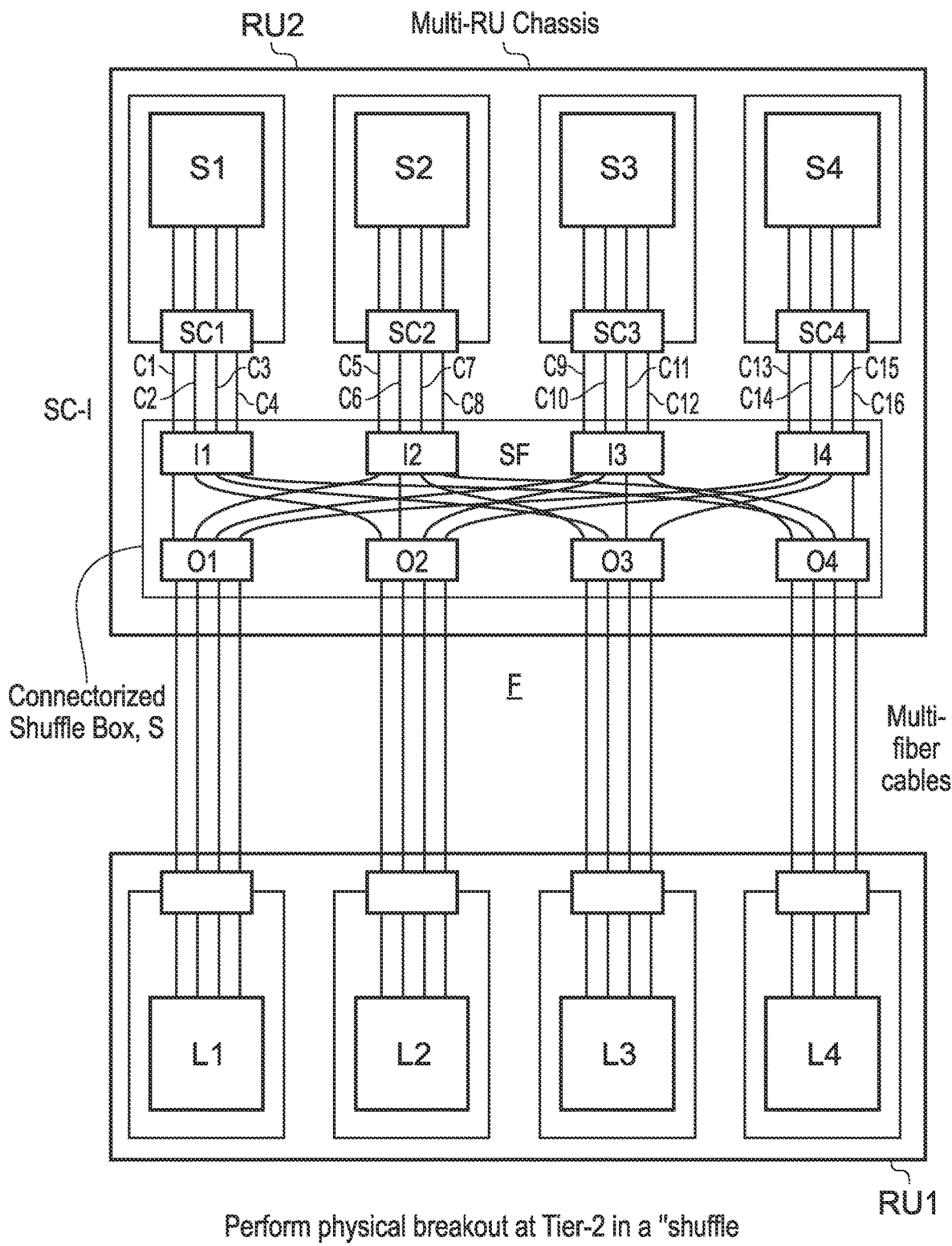
FIG. 5 shows an embodiment of the present invention in which there is a shuffle box present on the Tier-2 switch module housing unit.

FIG. 5 shows a switch according to an embodiment of the present invention. The switch includes a Tier-1 switch module housing unit RU1 and a Tier-2 switch module housing unit RU2. For the purposes of this description, we will refer to the Tier-1 switch module housing unit RU1 as a leaf switch module housing unit and the Tier-2 switch module housing unit RU2 as a spine switch module housing unit. However, it should be noted that the Tier-1 switch module housing unit could be a spine switch module housing unit and the Tier-2 switch module housing unit could be a leaf switch module housing unit. This is particularly true given that in some embodiments of the present invention the components used as the leaf switch modules and the spine switch modules may be identical, and differ only in the components to which they are connected, and the manner in which they are programmed to operate.

Leaf switch module housing unit RU1 includes four leaf switch modules L1 to L4. Each of the leaf switch modules may be as described in WO 2018/153939 A1, which is incorporated herein by reference, or switch modules such as the Edgecore 32×100G QSFP28[1]. Each of the leaf switch modules L1 to L4 includes a connector LC1 to LC4, arranged to connect the leaf switch modules L1 to L4 to the switching fabric F. Each connector has four output connections C1 to C16. Though it is not shown in FIG. 5, these sixteen connections C1 to C16 may be combined into four multi-fibre cables. It should be noted that this is not possible in the arrangement of FIG. 4, as outlined above.

Spine switch module housing unit RU2 includes four spine switch modules S1 to S4. Each of the spine switch modules may be as described in WO 2018/153939 A1, which as mentioned above, is incorporated herein by reference. Each of the spine switch modules S1 to S4 includes a connector SC1 to SC4. Spine switch module housing unit RU2 further includes shuffle box S, which is central to some embodiments of the present invention. Shuffle box S includes four input modules I1 to I4, and four output modules O1 to O4. Connectors SC1 to SC4 are connected to the input modules I1 to I4 via physical connections in layer SC-1 of the spine switch module housing unit RU2. The shuffle box S further includes a shuffle fabric SF. The shuffle fabric is in the form of a full-mesh interconnect connecting each shuffle input module with each shuffle output module. The shuffle output modules O1 to O4 are connected to the switching fabric F.

[1] https://www.edge-core.com/productsInfo.php?cls=1&cls2=5&cls3=15&id=545

The shuffle output modules O1 to O4 are each configured to receive a signal from a respective one of the shuffle input modules I1 to I4. So, each set of adjacent fabric connections shown in FIG. 5 is arranged to transmit a signal from a respective one of spine switch modules S1 to S4 to the leaf switch module of L1 to L4 to which it is connected. By including a shuffle box S which is localized on only one switch module housing unit (in this case, RU2) it is possible to introduce an additional layer of switching which enables a reduced fibre count in the switching fabric F. FIG. 5 is schematic, and thus it should be appreciated that the four outputs from each leaf switch module L1 to L4 and spine switch module S1 to S4 may in fact represent individual physical lanes within a single port. Thus, the arrangement of FIG. 5 demonstrates how some embodiments of the present invention allow lane breakout without a massively increased fibre count. Specifically, this is enabled by the use of a shuffle box S which is contained on one switch module housing unit only, which performs switching of signals before they leave that switch module housing unit, to ensure that they can be transmitted across the fabric in a manner whereby they can be combined (either using PSM or WDM) into fewer physical connections.

In embodiments in which the connections shown in FIG. 5 represent different lanes of the same physical port, an additional shuffle box would be required for any additional set of ports. Here, "set of ports" takes the same meaning as it does earlier in this application, i.e. the set of "first ports" or "second ports" on a given switch module housing unit.

Figure 6A:
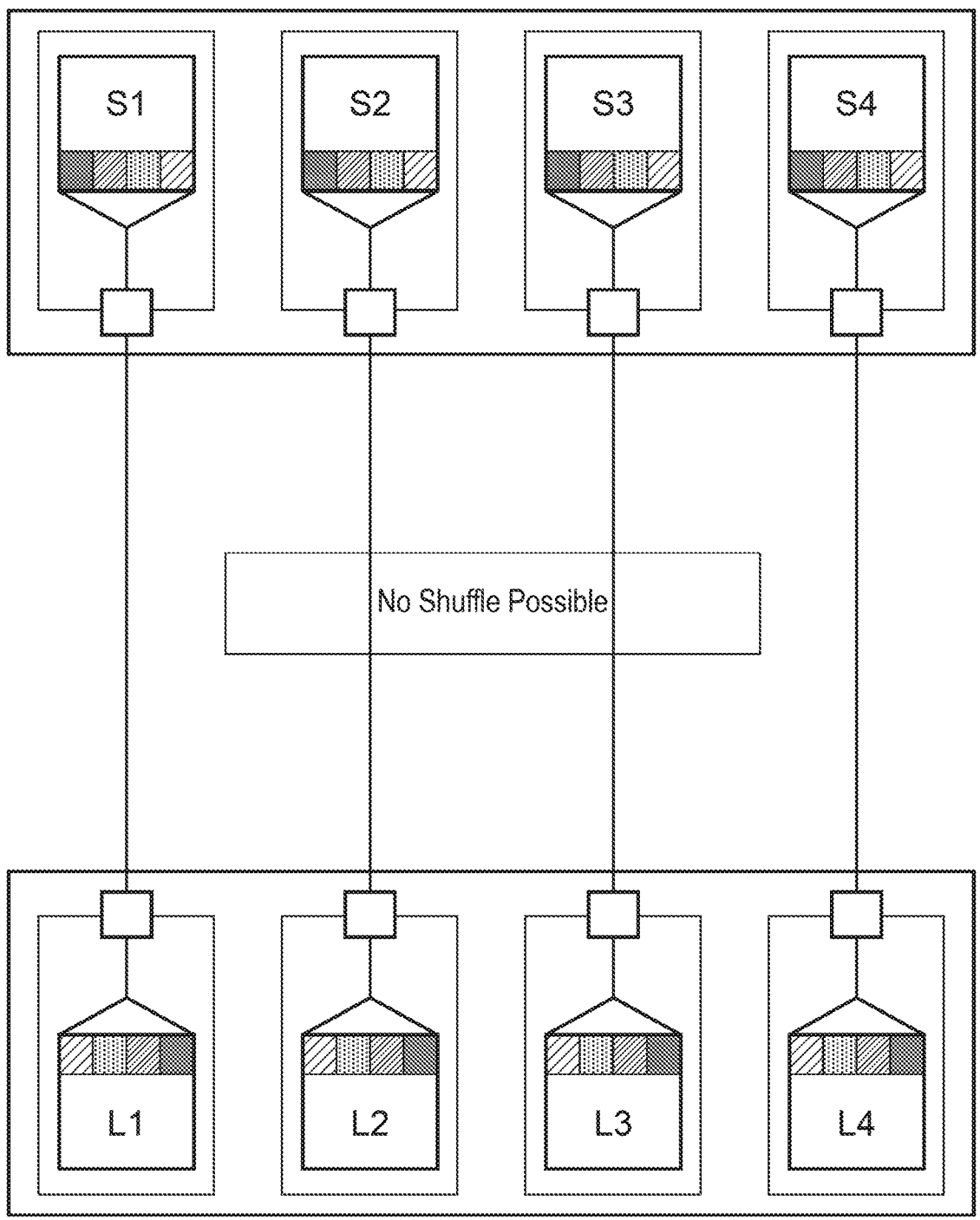
FIG. 6A shows a prior art arrangement in which no lane breakout is possible.
Figure 6B:
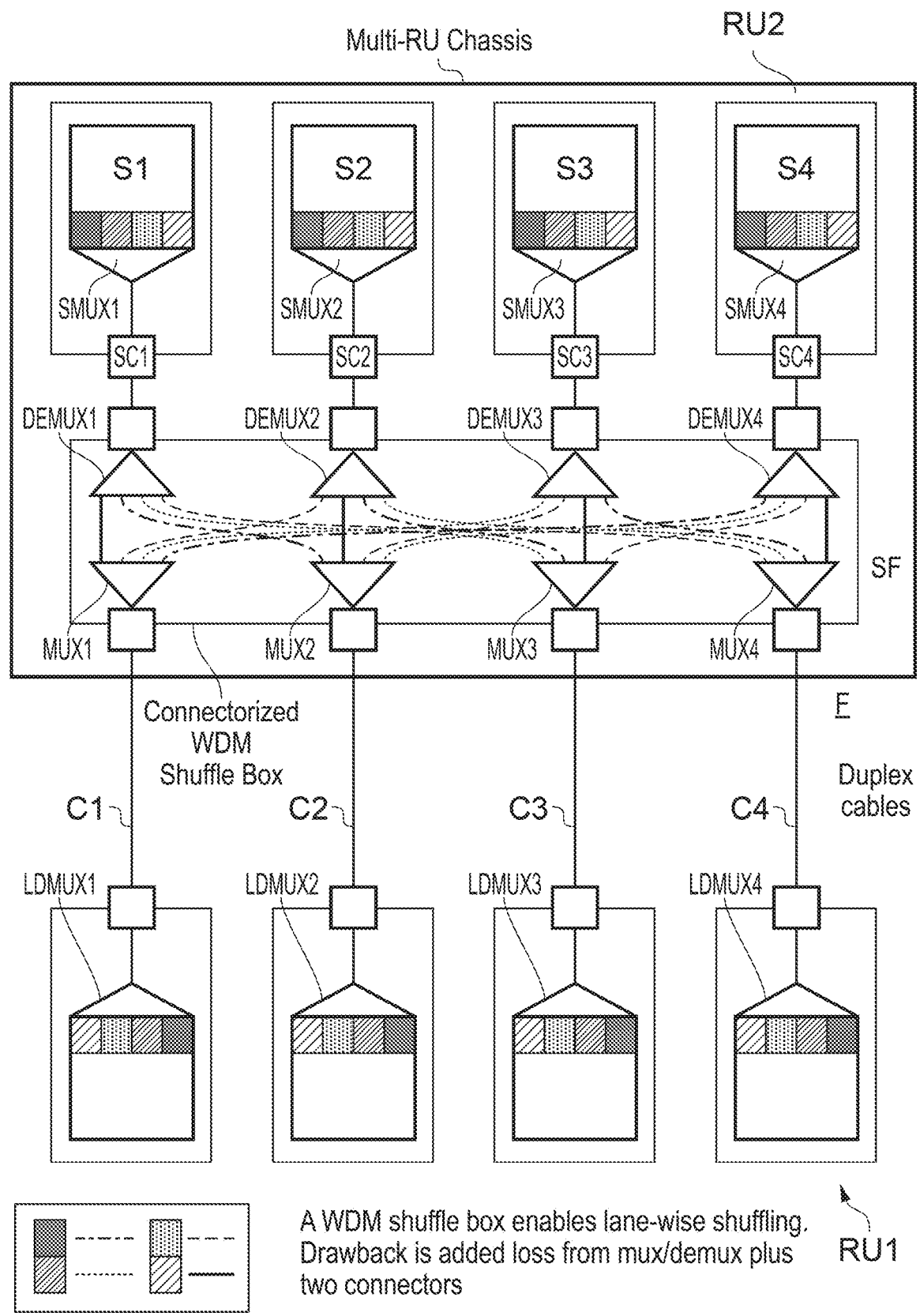
FIGS. 6B and 6C show further embodiments of the present invention which are directed specifically towards switching of optical signals.

FIGS. 6A and 6B illustrate specifically optical arrangements. Similar reference numerals are used for similar features throughout. FIG. 6A illustrates a prior art arrangement in which lane-wise shuffling is not possible. In this example, all switch modules are shown as having a single port, with four lanes. Each of the four physical lanes is configured to carry an optical signal having a different wavelength, highlighted by the different shading in the boxes on the switch modules. The port includes a multiplexer configured to combine the four different-wavelength optical signals into a single WDM signal. In practice, the multiplexer may be comprised in an optical transceiver module (as indeed, may the demultiplexer on the opposite side). In this case, the switch fabric includes four optical fibres, each transmitting four optical signals having different wavelengths (to prevent interference as the signals travel). In this case, there is no opportunity for shuffling of the lanes within a given switch module. So, optical signals may only be transmitted from a spine switch module to its corresponding leaf switch module.

FIG. 6B shows an embodiment of the present invention which exhibits improved switching capability. The embodiment includes a Tier-1 switch module housing unit, or leaf switch module housing unit RU1 and a Tier-2 switch module housing unit, or spine switch module housing unit RU1. The leaf switch module housing unit RU1 includes four leaf switch modules L1 to L4. In the embodiment shown in FIG. 6B, each of the leaf switch ports L1 to L4 is shown with only a single port. This is for illustrative purposes, and the skilled person will appreciate that in reality, the leaf switch modules could include a plurality of ports. The ports shown are each made up of four physical lanes, each configured to carry an optical signal having a different wavelength.

The spine switch module housing unit RU2 includes four spine switch modules S1 to S4. As with the leaf switch modules L1 to L4, each of the spine switch modules also includes a single port, made up of four physical lanes, each configured to carry an optical signal having a different, respective wavelength.

Each of the leaf switch modules L1 to L4 includes four physical lanes, each configured to transmit an optical signal having a different wavelength $\lambda_1$ to $\lambda_4$. Each of the leaf modules includes a demultiplexer LDMUX1 to LDMUX4, arranged to separate, per port, the multiplexed signals received from the duplex cables C1 to C4 into a plurality of signals, each directed towards one of the plurality of lanes of the port.

Figure 6C:
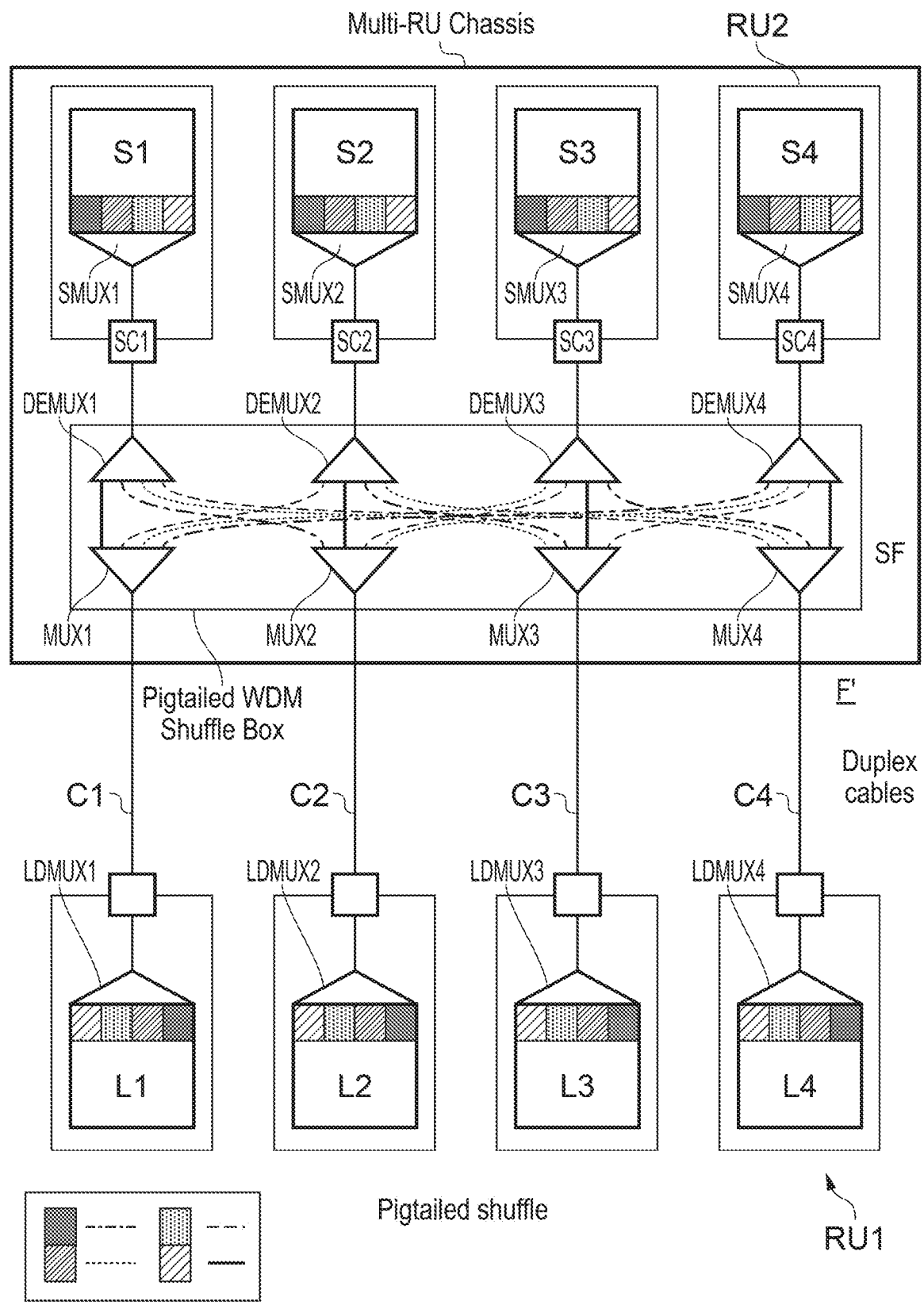

Spine switch module housing unit RU2 includes four spine switch modules S1 to S4, which may be the same components as the leaf switch modules L1 to L4. Like the leaf switch modules L1 to L4, each of the spine switches includes a port having four physical lanes, each configured to transmit an optical signal having a different wavelength $\lambda_1$ to $\lambda_4$. Each of the spine switch modules S1 to S4 includes a multiplexer SMUX1 to SMUX4, which is arranged to combine the optical signals having wavelengths $\lambda_1$ to $\lambda_4$ into a single multiplexed signal, which is sent via a connector module into optical media SC1 to SC4. The spine switch module housing unit RU2 further includes a shuffle box S (though it will be appreciated that the shuffle box could also be located on the leaf side). The shuffle box S includes four input demultiplexers DEMUX1 to DEMUX4, and four output multiplexers MUX1 to MUX4. Each of the demultiplexers DEMUX1 to DEMUX4 is configured to receive a respective multiplexed optical signal from a respective one of spine switch modules L1 to L4. In the embodiment shown in FIG. 6B, the signal passes through two connector modules before reaching a demultiplexer DEMUX1 to DEMUX4, whereas in FIG. 6C the optical media SC1 to SC4 are pigtailed directly to the demultiplexers DEMUX1 to DEMUX4. The demultiplexers DEMUX1 to DEMUX4 then split the multiplexed optical signal into its four constituent signals, and direct each signal to a different one of multiplexers MUX1 to MUX4. Each of multiplexers MUX1 to MUX4 is arranged to receive signals having four different wavelengths, and then to combine those signals to generate a single multiplexed output signal, which is subsequently transmitted to one of optical media C1 to C4 in the switching fabric F. In order to ensure that each multiplexer MUX1 to MUX4 receives a signal of a different wavelength, the demultiplexers DEMUX1 to DEMUX4 direct their outputs in a cyclic manner, as set out in Table 1 above. In FIG. 6A multiplexers MUX1 to MUX4 are arranged to output the multiplexed output signal to the switching fabric F via a connector. In FIG. 6B, the multiplexers MUX1 to MUX4 are pigtailed directly to cables C1 to C4 respectively.

Figure 7A:
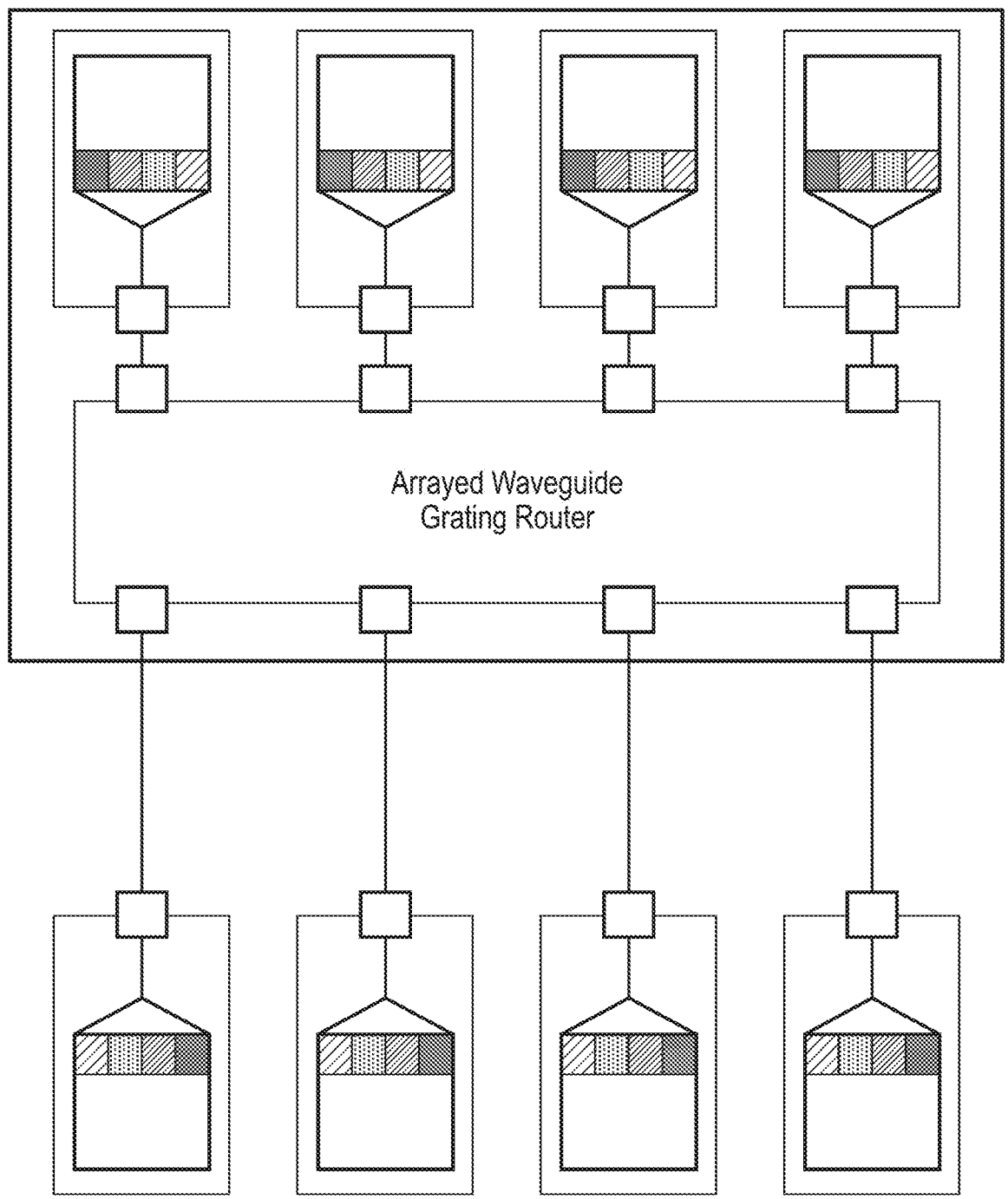
FIGS. 7A to 7D show alternative embodiments of the present invention with a different arrangement of leaf switch modules, spine switch modules and shuffle boxes.
Figure 7B:
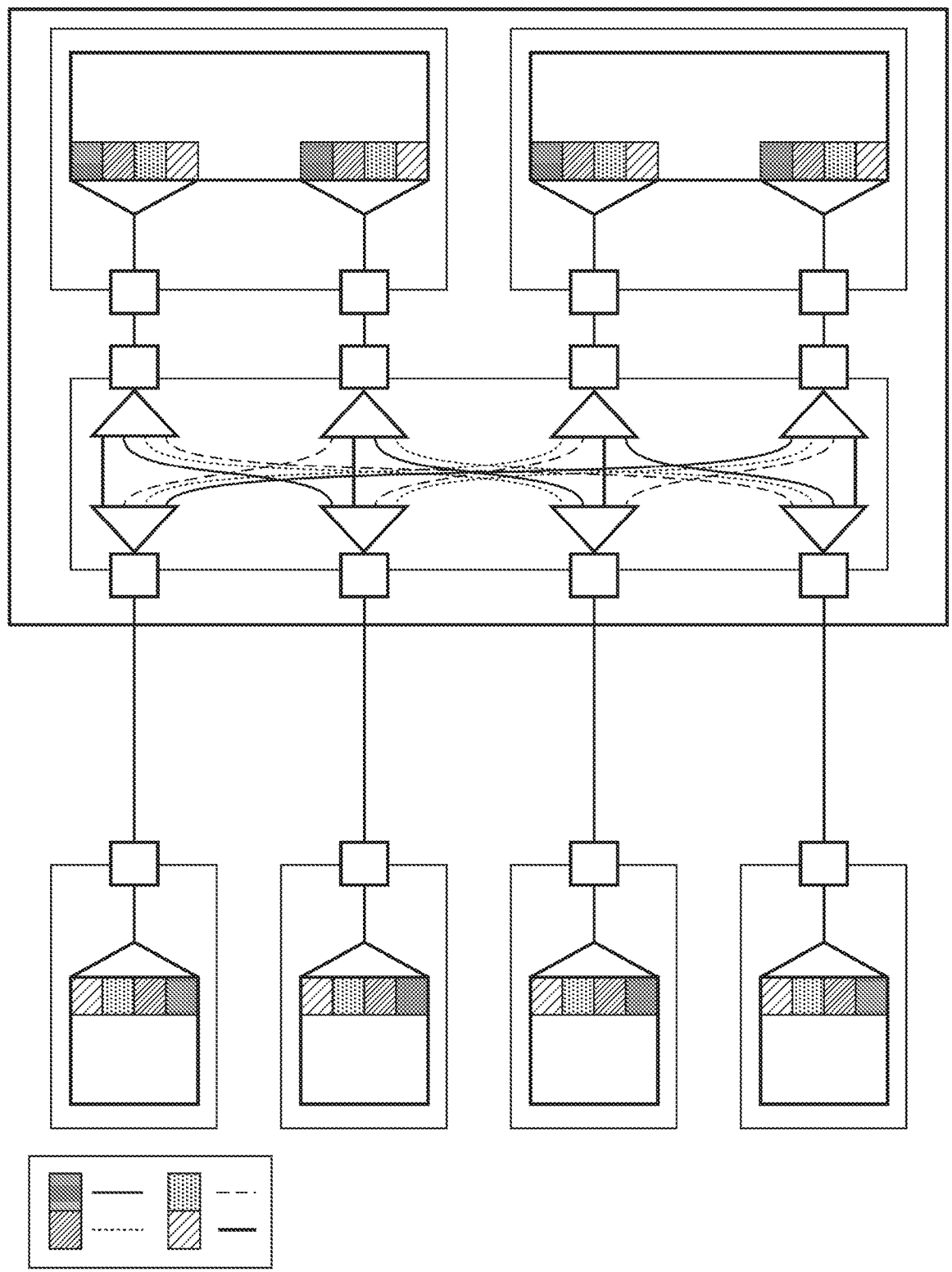
Figure 7C:
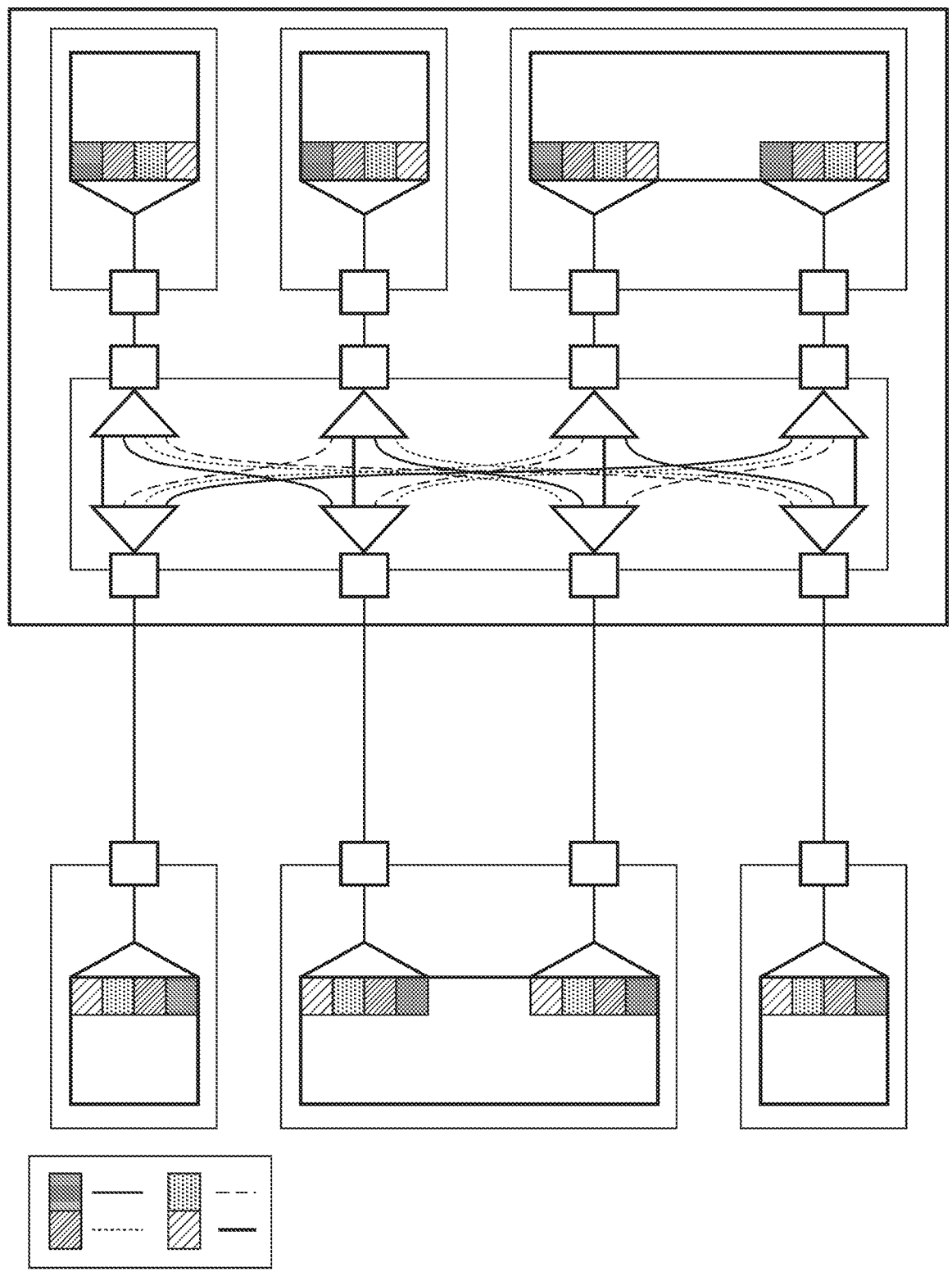
Figure 7D:
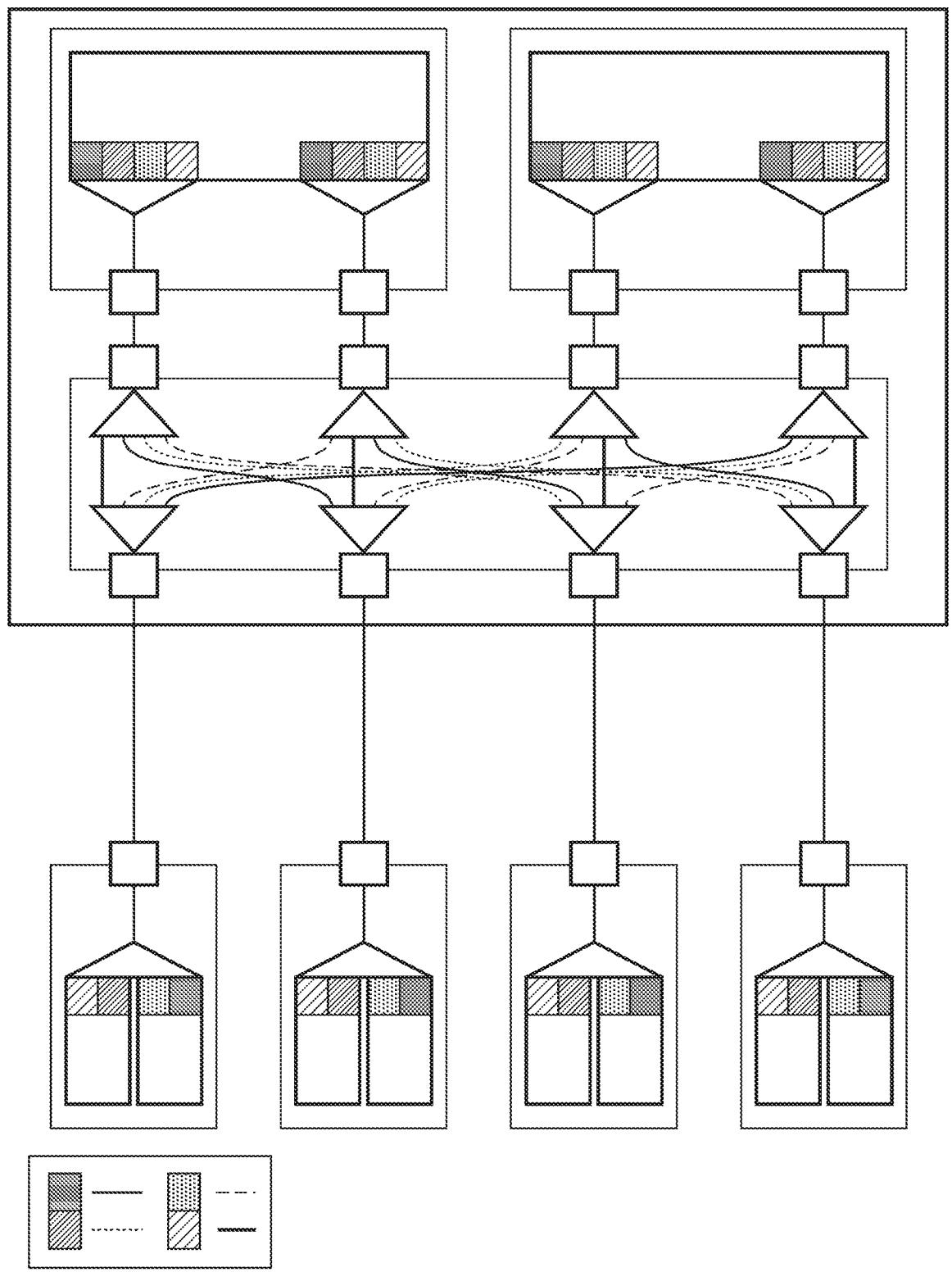

FIGS. 7A to 7D show examples in which there are different arrangements of spine switch modules, leaf switch modules and shuffles. In FIG. 7A, the shuffle box is in the form of an arrayed waveguide grating (AWG) router, e.g., a monolithic AWG router. In FIG. 7B, there are only two spine switch modules, each connected to two separate demultiplexers of the shuffle box. FIG. 7C shows a mixed arrangement, in which there are three spine switch modules and three leaf switch modules. In FIG. 7D there are two spine switch modules and four leaf switch modules.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention. All references referred to above are hereby incorporated by reference.

The invention claimed is:

1. A switch for switching a signal between a source client device and a destination client device, the switch including:
    a first switch module housing unit including:
        a first switch module, configured to output a first optical signal having a first wavelength, and a second optical signal having a second wavelength;
        a second switch module, configured to output a first optical signal having the first wavelength; and
        a shuffle, including:
            a first input,
            a second input,
            a first output, and
            a second output,
        wherein:
            the first input is configured to receive the first optical signal and the second optical signal from the first switch module, and to direct the first optical signal of the first switch module to the first output and the second optical signal of the first switch module to the second output; and
            the second input is configured to receive the first optical signal from the second switch module, and to direct the first optical signal of the second switch module to the second output, and a second switch module housing unit including:
  a third switch module configured to receive the first optical signal of the first switch module from the first output of the shuffle; and
  a fourth switch module configured to receive the second optical signal of the first switch module and the first optical signal of the second switch module from the second output of the shuffle.

2. A switch according to claim 1, wherein:
the first switch module includes a first port having a first lane and a second lane, wherein the first optical signal of the first switch module is output from the first switch module via the first lane and the second optical signal of the first switch module is output from the first switch module via the second lane.

3. A switch according to claim 1, wherein:
the first switch module further includes a first multiplexer configured to combine the first optical signal of the first switch module and the second optical signal of the first switch module into a first multiplexed signal, which is output into a single optical medium.

4. A switch according to claim 3, wherein:
the first input of the shuffle includes a first demultiplexer, which is configured to separate the first multiplexed signal into its constituent components;
the first optical signal of the first switch module is directed towards the first output; and
the second optical signal of the first switch module is directed towards the second output.

5. A switch according to claim 3, wherein:
the second switch module is configured to output a second signal;
the second input is configured to receive the second signal from the second switch module; and
the second input is configured to:
  direct the second signal from the second switch module to the first output.

6. A switch according to claim 5, wherein:
the second signal is a second optical signal having a third wavelength; and
the second switch module further includes a second multiplexer configured to combine the first optical signal of the second switch module and the second optical signal of the second switch module into a second multiplexed signal, which is output into a single optical medium.

7. A switch according to claim 6, wherein:
the first input of the shuffle is a first demultiplexer, configured to split the first multiplexed signal into its constituent components, and to direct the first optical signal of the first switch module to the first output and to direct the second optical signal of the first switch module to the second output; and
the second input of the shuffle is a second demultiplexer configured to split the second multiplexed signal into its constituent components, and to direct the first optical signal of the second switch module to the second output and the second optical signal of the second switch module to the first output.

8. A switch according to claim 7, wherein:
the first output includes a first output multiplexer configured to combine the first optical signal of the first multiplexed signal and the second optical signal of the second multiplexed signal into a first multiplexed fabric signal;

the first output multiplexer is configured to direct the first multiplexed fabric signal to a switching fabric;
the second output includes a second output multiplexer configured to combine the second optical signal of the first multiplexed signal and the first optical signal of the second multiplexed signal into a second multiplexed fabric signal; and
the second output multiplexer is configured to direct the second multiplexed fabric signal to the switching fabric.

9. A switch according to claim 5, wherein:
the first switch module includes a first port and a second port;
the second switch module includes a first port and a second port;
the shuffle is a first shuffle, configured to shuffle signals originating from the first ports; and
the first switch module housing unit further includes a second shuffle, configured to shuffle signals from the second ports.

10. A switch according to claim 1, wherein:
the second switch module is an identical component to the first switch module.

11. A switch according to claim 1, wherein:
the second input is configured to receive a third signal and direct it to the first output; and
wherein the third switch module is configured to receive the first optical signal and the third signal from the first output of the shuffle.

12. A switch according to claim 11, wherein:
the third switch module includes a first port having a first lane and a second lane, wherein the first optical signal of the first output is received by the third switch module via the first lane, and the third signal is received by the third switch module via the second lane.

13. A switch according to claim 11, wherein:
the third signal is a third optical signal having a third wavelength;
the first output of the shuffle includes a first shuffle multiplexer configured to combine the first optical signal of the first switch module and the third optical signal into a first multiplexed signal, which is then output to the third switch module via an optical medium; and
the third switch module includes a demultiplexer configured to split the first multiplexed signal into its constituent components.

14. A switch according to claim 13, wherein:
the fourth switch module is configured to receive the second optical signal and a fourth signal from the second output; and
a third input of the shuffle is configured to receive the fourth signal, and to direct the fourth signal to the second output.

15. A switch according to claim 14, wherein:
the fourth signal is a fourth optical signal having a fourth wavelength; and
the second output of the shuffle includes a second shuffle multiplexer, configured to combine the fourth optical signal from the third input and the second optical signal from the first input into a second multiplexed signal, which is then output to the fourth switch module via a single optical medium.

16. A switch according to claim 15, wherein:
the demultiplexer of the third switch module is a first demultiplexer; and the fourth switch module includes a second demultiplexer which is configured to split the second multiplexed signal into its constituent components.

17. A switch according to claim 16, wherein:

the first input of the shuffle is configured to receive a first multiplexed input signal, and the second input of the shuffle is configured to receive a second multiplexed input signal;

the first input of the shuffle includes a first input demultiplexer configured to separate the first multiplexed input signal into its constituent components, including the first optical signal of the first switch module and the second optical signal; and the second input of the shuffle includes a second input demultiplexer configured to separate the second multiplexed input signal into its constituent components, including the third optical signal and the first optical signal of the second switch module.

18. A switch according to claim 14, wherein:

the third switch module includes a first port and a second port;

the fourth switch module includes a first port and a second port;

the shuffle is a first shuffle, configured to shuffle signals destined for the first ports; and the first switch module housing unit further includes a second shuffle, configured to shuffle signals destined for the second ports.

19. A method of switching a signal from a source client device to a destination client device, the method including the steps of:

receiving at a first input of a shuffle, a first optical signal having a first wavelength and a second optical signal having a second wavelength, the first optical signal and the second optical signal received from a first switch module;

receiving at a second input of the shuffle, a first optical signal from a second switch module, the first optical signal of the second switch module having the first wavelength;

directing the first optical signal of the first switch module to a first output of the shuffle; and directing the second optical signal of the first switch module and the first optical signal of the second switch module to a second output of the shuffle.

20. A method of using the switch according to claim 11, the method comprising:

receiving, at the first input of the shuffle, the first optical signal of the first switch module;

receiving, at the second input of the shuffle, the third signal;

directing the first optical signal of the first switch module and the third signal to the first output of the shuffle; and directing the first optical signal of the first switch module and the third signal to the third switch module.

* * * * *